May 27, 1941.　　　　　A. ASHTON　　　　　2,243,306
POWER CONTROL FOR EARTH WORKING DEVICES
Filed Jan. 17, 1938　　　　4 Sheets-Sheet 1
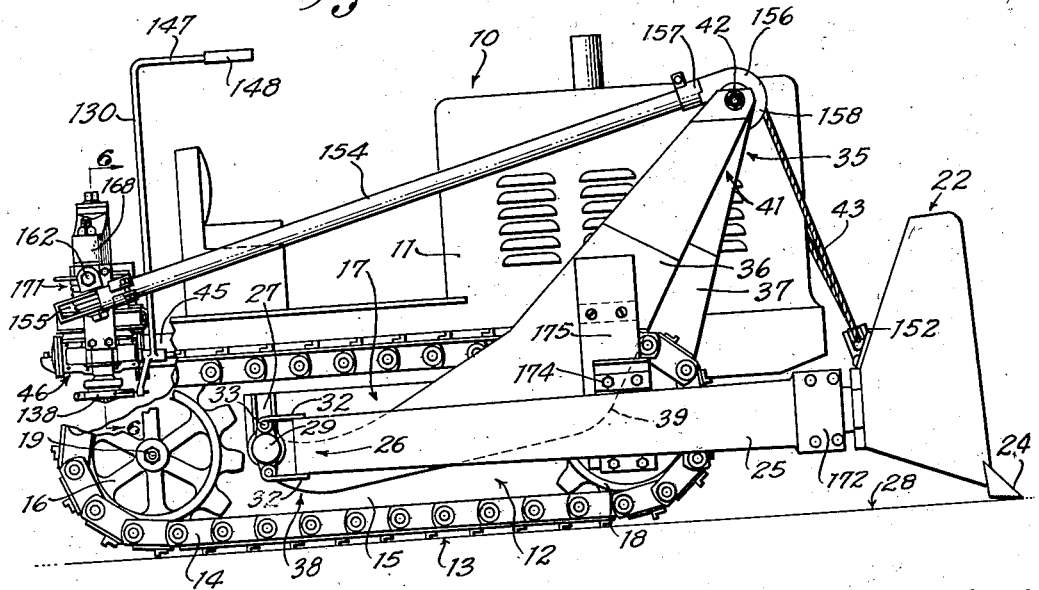
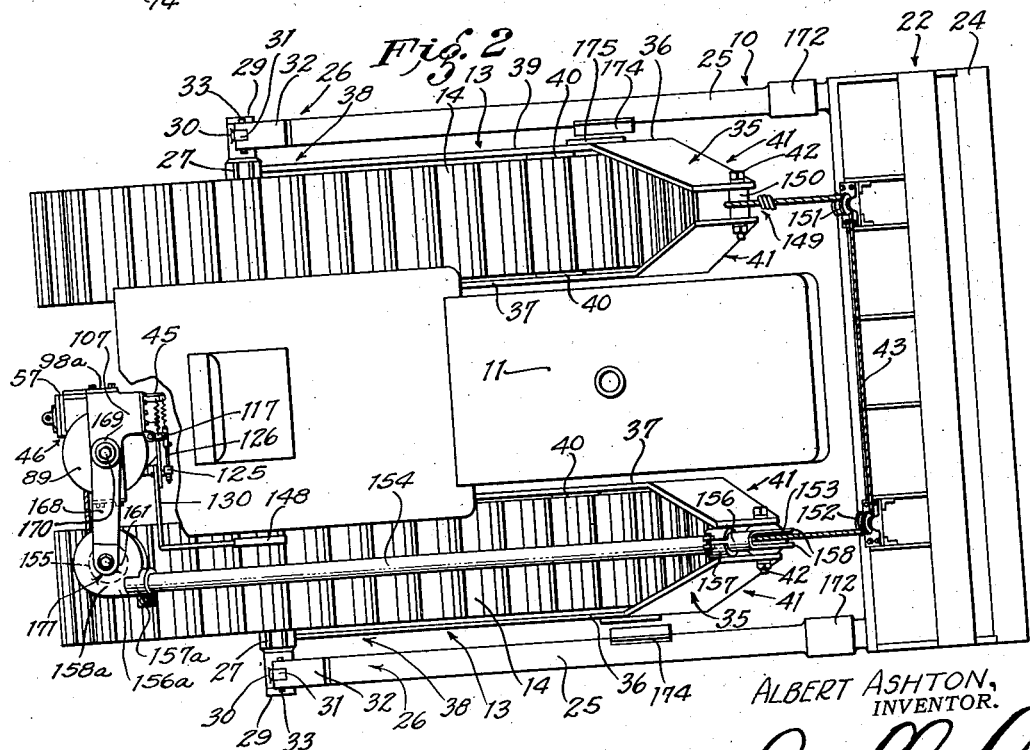
ALBERT ASHTON, INVENTOR.

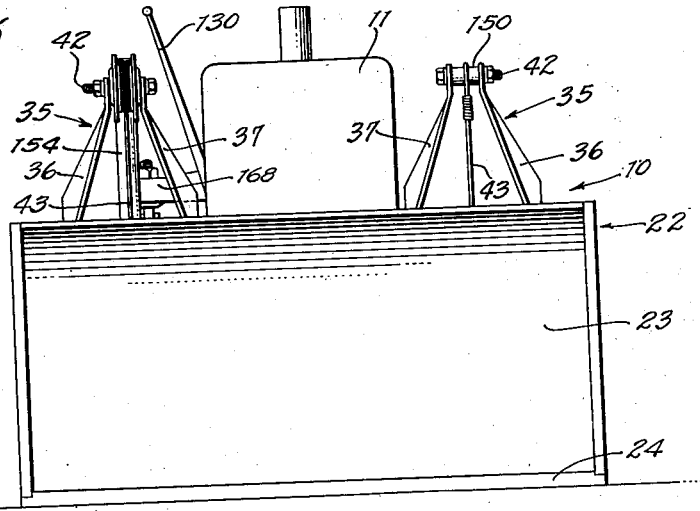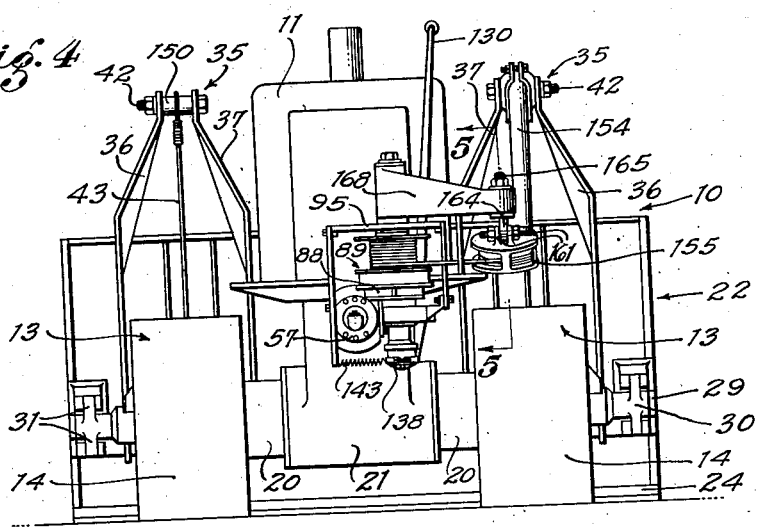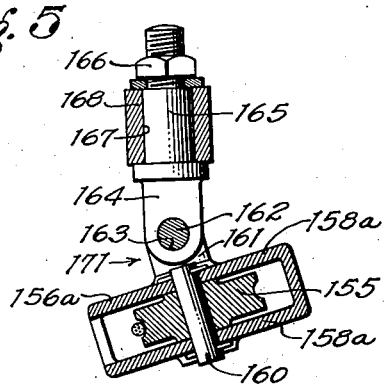

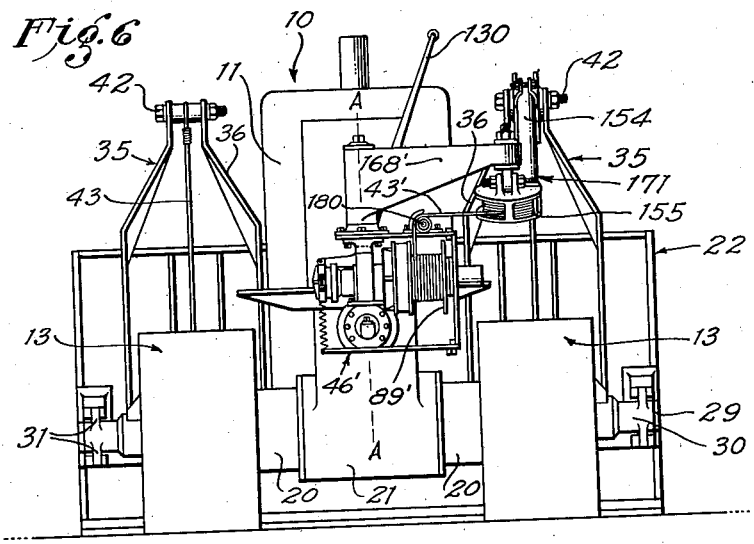
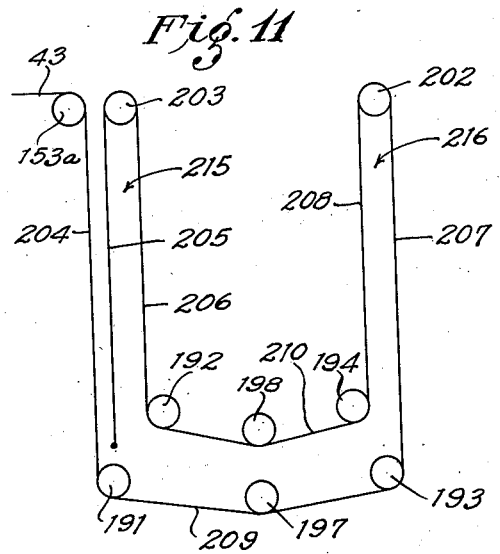

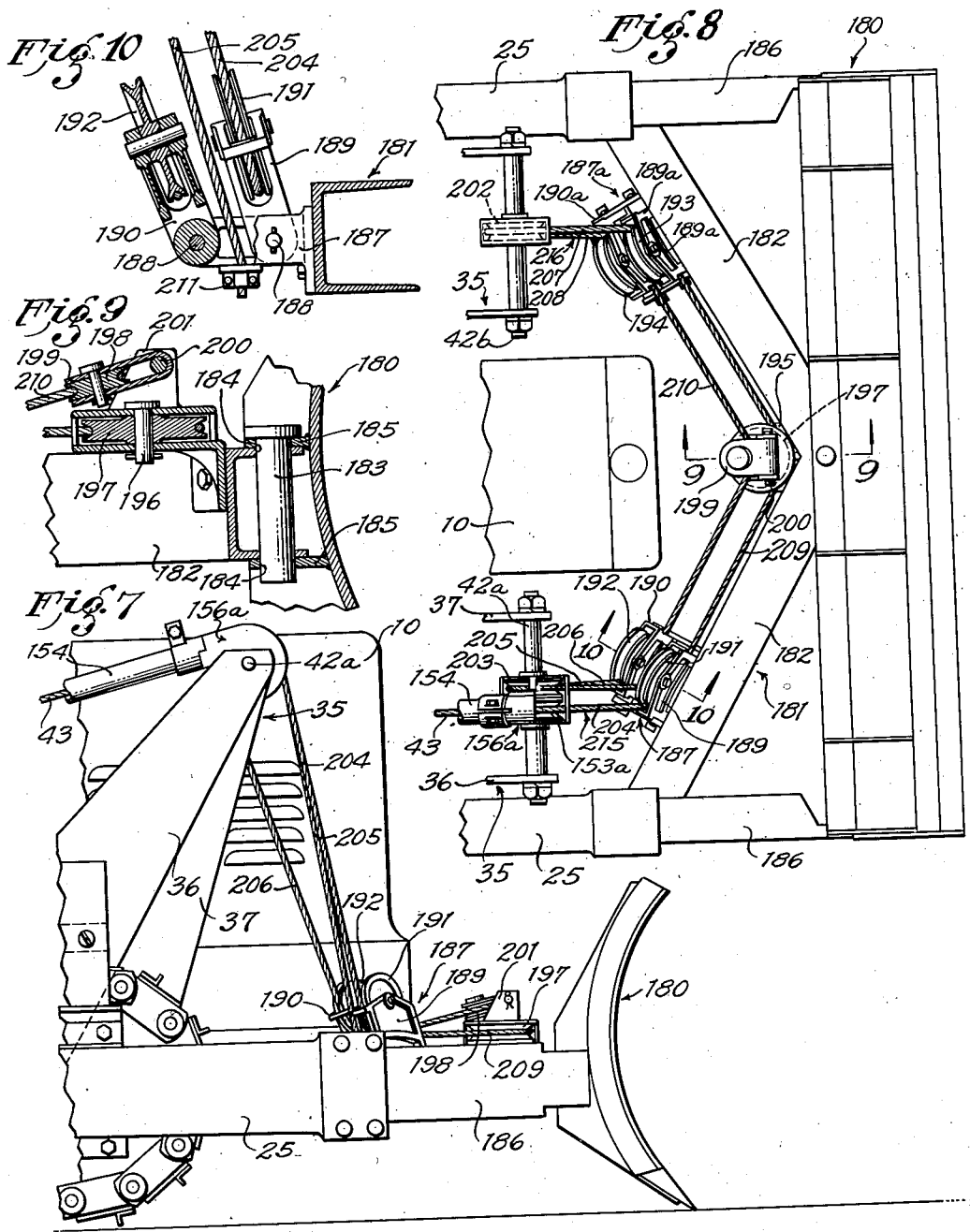

Patented May 27, 1941

2,243,306

UNITED STATES PATENT OFFICE 2,243,306

POWER CONTROL FOR EARTH WORKING DEVICES

Albert Ashton, Los Angeles, Calif., assignor, by mesne assignments, to The Buckeye Traction Ditcher Company, Findlay, Ohio Application January 17, 1938, Serial No. 185,270

13 Claims. (Cl. 37—144)

My invention relates in general to ground working implements of the power driven type having ground working or ground engaging tool means movably supported thereon so as to be adjusted to different positions or conditions of operation, and relates in particular to a controllable, power operated means for moving the tool means as may be desired or required in the operation thereof.

My invention is of especial utility with those types of devices, such for example as bulldozers, trail builders, etc., wherein tools or blades are mounted upon a tractor so as to be moved through their various positions. It is an object of the present invention to provide a simple, reliable and readily controlled means whereby a tool or tools may be moved or adjusted on a supporting vehicle in accordance with the requirements of the work being done by the device.

In ground working devices of the general type to which my invention relates a track-laying tractor is employed and the desired tool equipment is supported in projecting relation thereto. Owing to the fact that the forward portions of the tractor tread supports are independently movable in vertical direction so as to have compensation for unevenness of the ground over which the tractor is driven, more or less has been encountered in the provision of suitable supporting means for the tool equipment which is ordinarily very heavy and is subjected to great strain during the operation of the device. It is an object of the present invention to provide a novel means for movably supporting the tool equipment of a ground or road working device of the above character wherein the loads and forces incidental to the use of heavy tool or blade members will be applied in a manner to avoid the possibility of breaking or otherwise injuring the tractor structure.

The bodies of the tractors employed in the construction of these types of devices generally consist of an engine casting or castings and transmission housing castings bolted together in longitudinal relation. To this body or superstructure of the tractor the undercarriage structure, including the tread members, is connected in a flexible manner so as to permit the vertical movement of the tread members as previously herein mentioned, and this characteristic construction of tractors has presented a serious problem concerning the mounting of heavy tool devices directly upon the tractor without the application of strains which are liable to result in injury to the tractor structure. Many instances have been found where the strains produced in the operation of the ground engaging tools have broken castings of the tractor superstructure incurring considerable expense and serious delay in the work to be done. An object of my invention is to provide a device of the above character wherein the ground engaging elements are supported entirely upon the tread elements instead of fully or partly upon the superstructure as in previous construction wherein breakage of the tractor parts has been caused, and to so mount the ground engaging elements that all possibility of transmitting breaking strains to the tractor structure is avoided and in such a manner that the free compensating movement of the tread elements relative to the superstructure is in no way interfered with.

It is a further object of the invention to provide a device of the above character wherein the ground engaging elements are mounted directly upon the tread elements in such a manner that there may be a relative movement of the tread elements and the ground engaging elements during the operation of the device over an uneven ground or road surface.

It is a further object of the invention to provide in conjunction with a ground or road working device of the above character an efficient power take-off with means for transmitting power to the ground engaging element of the device so as to move the same as required, this means being so connected as to adjust itself to the movement of the tractor parts thereby avoiding the placing of dangerous strains in any of the cooperating parts. In the preferred form of the invention, a power take-off of cable type is mounted at the rearward end of the tractor and the cable is guided over a sheave carried by a swingable arm to the forward part of the tractor to make connection with the part to be moved. At the front end of the tractor a sheave means is supported by means of a member which extends forwardly from the sheave which is supported by the swingable arm, so that any movement of the forward sheave means may be accompanied by a compensating movement of the swingable arm with the placing of destructive strains in the cooperating structural parts of the device.

It is a further object of the invention to provide in a device of this character a novel cable lift means for the tool supported at the forward end of the tractor, which lift means is so designed that it will operate smoothly in response to a pull placed in, or the release of, a cable and employs cable strands so arranged that frictional resistance of the cable sheave employed in the lift device will be compensated.

Further objects and advantages of the invention will be brought out in the following part of the specification.

Referring to the drawings which are for illustrative purposes only,

Fig. 1 is an elevational view showing a simple form of the invention, a portion of the structure being broken away to show an elevation of the power take-off.

Fig. 2 is a plan view corresponding to Fig. 1, a portion thereof being also broken away to disclose parts of the power take-off.

Fig. 3 is a front end view of the device.

Fig. 4 is a rear end view of the device.

Fig. 5 is an enlarged fragmentary section taken as indicated by the line 5—5 of Fig. 4.

Fig. 6 is a rear elevation showing a form of my invention in which a horizontal cable drum is used instead of the vertical drum shown in Fig. 4.

Fig. 7 is an elevational view of the forward end of a ground working device, this view showing my improved cable lift means for the ground engaging tool.

Fig. 8 is a plan view corresponding to Fig. 7.

Fig. 9 is an enlarged fragmentary section taken as indicated by the line 9—9 of Fig. 8.

Fig. 10 is an enlarged fragmentary section taken as indicated by the line 10—10 of Fig. 8.

Fig. 11 is a diagram showing the lines of cable running between the upper and lower sheaves of the lift device shown in Figs. 7 and 8.

In Figs. 1 to 4 of the drawings I have shown a tractor 10 having a body or superstructure 11 and an undercarriage 12 which includes a pair of tread elements 13 lying on opposite sides of and below the plane of the superstructure 11 and each consisting of a tread chain 14 and a supporting means 15 therefor. The supporting means 15 each include a drive sprocket 16, as best shown in Fig. 1, longitudinal bar or spreader members 17 which extend forwardly from the sprockets 16 in positions within the loops of the tread chains 14 and carrying idler wheels 18 at the forward ends thereof over which the forward portions of the tread chains 14 run. The drive sprockets 16 are mounted on axle shafts 19, as indicated in Fig. 1, each axle shaft 19 projecting laterally from an end of a rear axle housing 20, there being two of such rear axle housings, disposed in positions to project oppositely from a transmission casing 21 located at the rearward end of body 11 of the tractor.

The ground engaging tool means employed in the form of the invention shown consists of a pusher member 22 having a blade or plate member 23 with a knife 24 at the lower edge thereof. This ground engaging tool, or pusher member 22 has a pair of arms or thrust bars 25 extending rearwardly from the ends thereof and along the sides of the tread elements 13, and having their rearward or leftward ends 26 pivotally connected to the rearward portions of the tread elements 13 by means of mounting blocks or brackets 27 which are secured to the rearward portions of the outer side bars 17 of the tread elements 13, or, these mounting blocks 27 may be integrally formed as parts of the longitudinal bar members 17.

The bulldozer structure represented by the pusher member 22 may be raised or lowered relative to the ground or road surface 28, Fig. 1, by swinging the arms 25 on the pivot members formed by the brackets or blocks 27. To provide the desired pivotal connection, each member 27 is equipped with an extending trunnion 29 on which a sleeve 30 is turnably mounted. Each of the sleeves 30 has a pair of vertically and oppositely extended lugs 31 to which plates 32 at the rearward ends of the arms 25 are connected by means of pins 33. It will be seen that with this construction all thrust imparted to the pusher member 22 as the result of the operation of the bulldozer will be transmitted to the tread elements 13.

The weight of the pusher member 22 and the forward portions of the arms 25 is also carried directly by the tread elements 13 by the use of a boom member 35 which is preferably employed in duplicate, one on each of the tread elements 13. Each of these boom members 35 is connected solely to the cooperating tread element 13 and therefore without direct connection to the tractor body 11. Each boom member 35 comprises an outer plate 36 and an inner plate 37, the outer plates 36 extending along the outer faces of the tread elements 13 and being connected to the outer longitudinal bar or spreader members 17, and the inner plate members 37 extending along the inner faces of the tread elements 13 and being connected likewise to the inner bar members 17 of the tread elements 13. The rearward ends 38 of the outer plate members 36 are connected preferably to the mounting blocks 27 and the intermediate portions 39 thereof are connected by means of members 40 to the forward portions of the tread elements 13. The inner plate members 37 are connected to the inner faces of the tread elements 13 in a similar manner. The forward ends 41 of the plate members 36 and 37 of the boom members 35 are extended forwardly and upwardly as clearly shown in Figs. 1 and 2, and the extremities thereof are converged toward each other and are connected by means of bolts 42. Lifting means or suspension means, shown in the form of a cable 43, is connected between the member 22 and the boom members 35 so that the weight or load of the tool represented by the member 22 will be received by the boom members 35 and transmitted thereby directly to the tread elements 13.

The cable 43 is actuated by a power take-off or winch 46, which is connected through the casing 45 at the rear end of the tractor, with the power means of the tractor. This power take-off 46 is of the type disclosed in the patent of H. A. Hutchins, No. 2,178,280, for Power take-off for power driven vehicle, and has a housing 57, external structural members 95, 98a, and 107, and is provided with a cable spool 89 on which the cable 43 is wound or from which it is permitted to unwind as the raising or lowering of the pusher member 22 may require. The power take-off 46 is provided with a control lever 130 having a forward extension 147 to support a handle 148 convenient to the operator of the tractor. The lower end of the lever 130 is connected, as shown in Fig. 1, to the control element 138 of the power take-off, and is adapted to move this control element 138 against the tension of a spring 143 which is placed as shown in Fig. 4. A link 126 connects a fitting 125 carried by the lever 130, with the projecting end 117 of a brake member 88, so that brake applying motion may be transmitted to the brake in response to a reverse movement of the lever 130.

As best shown in Fig. 2, the front end 149 of the cable 43 is connected to a sleeve 150 mounted on the bolt 42 at the upper end of the leftward boom member 35. From the sleeve 150, the cable 43 is carried downwardly and over a sheave 151, mounted on the back of the pusher member 22, to a second sheave 152 which is also mounted on the back of the pusher member 22. From the sheave 152, the cable 43 is extended to a sheave 153 supported on the bolt 42 which is disposed at the upper end of the right hand boom member 35. The cable 43 passes over the sheave 153 and through a tube 154 to a sheave 155 which is movably or adjustably mounted at one side of the power take-off 46. As the right hand tread element 13 of the tractor swings up and down on the axle member 19 associated therewith, the rearward sheave 155 is displaced forwardly and rearwardly and also rotates on a lateral axis as the forward end of the tube 154 swings upwardly and downwardly in accordance with the movement of the boom member 35 to which it is connected.

The forward end of the tube or spreader member 154 is connected by means of a sheave supporting member 156 to the bolt 42 which supports the sheave 153; this member 156 comprising a split sleeve 157, adapted to be clamped on the forward end of the tube 154, and a pair of plates 158 of circular form which extend forwardly from the split sleeve 157 on opposite sides of the sheave 153 and pivot on the bolt 42 which supports the sheave 153. The rearward sheave 155 is carried in a similar sheave supporting member 156a comprising a pair of plates 158a, as shown in Fig. 5, between which plates the sheave 155 is supported on a pin 160, and a split clamping sleeve 157a is adapted to receive the rearward end of the tube 154. From the upper plate 158a of the member 156a, a pair of lugs 161 project upwardly on opposite sides of the pin 160. These lugs 161 support a hinge pin 162 which passes through an opening 163 in the lower part of a vertical post 164 which has a pin portion 165 forming its upper end and being threaded to receive a nut 166. The vertical pin portion 165 is turnable in an opening 167 formed in the outer end of an arm 168 which is hingedly connected to the power take-off 46 so as to swing on a substantially vertical axis. The inner end of the arm 168 has a boss 169 which swings on a vertical pin 170 projecting up from the crossbar 95 of the power take-off 46. The members 162 and 164, with their associated parts, provide a universal connection 171 for attaching the sheave supporting means 156a and the rearward end of the tube 154 to the outer, or swinging end of the arm 168.

In the operation of the device, the loop of the cable 43 extending from the sleeve 150 and across the sheaves 151 and 152 to the sheave 153 is shortened or lengthened to accomplish the raising or lowering of the tool means represented by the pusher member 22. In the form of the invention shown, the pusher member 22 is rigidly secured to the forward ends of the arms 25 by means of joints 172 which permit vertical adjustment of the ends of the pusher member 22 so that the knife 24 will be disposed at a desired level. In the operation of the device over ground which is not level or has bumps therein, the rightward tread element 13 may be raised or lowered relative to the body 11 of the tractor. When this occurs, the bolt 42 which supports the sheave 153 swings on an arc around the axis of the shaft member 19, Fig. 1, and the member 156 which encloses the sheave 153 may turn on the aforementioned bolt 42. As the tube 154 is swung vertically and displaced forwardly and rearwardly there will be a turning of the sheave supporting means 156a on the universal joint means 171 and the arm 168 will swing a short distance on the pivot member 170, Fig. 2. The forward thrust against the sheave 155 due to the running of the cable 43 thereover is carried by the tube 154 and is transmitted by the tube 154 to the bolt 42 which carries the sheave 153 and the plates 158 of the member 156.

In the construction shown, the arms 25 are made relatively slender, since they need only carry the thrusts which are to be transmitted between the tractor 10 and the pusher or scraper 22. Side sway of the forward ends of the arms 25 is limited by side plates 174 which are mounted on the inner faces of the arms 25 adjacent plates 175 which are mounted in vertical planes on the side plates 36 of the pusher or scraper supporting members 35.

I have also shown the preferred form of the invention wherein the drum or spool 89 is mounted so as to rotate on a vertical axis so that the cable may pass directly from the spool to the sheave 155, as shown in Figs. 2 and 4, without the need for intervening guide pulleys. This feature is independent of the other valuable features of the invention which accordingly may be used with a power take-off device having a horizontally disposed cable spool. To illustrate this I have in Fig. 6 shown the tractor 10 equipped with the boom members 35 on the respective tread elements 13, and the pusher or scraper member 22. In the device shown in Fig. 6, the power take-off 46' is turned on its side so that its spool 89' will rotate on a horizontal axis. The arm 168' which corresponds to the arm 168 of Fig. 4, is hinged above the power take-off 46' so as to swing on a vertical axis A—A. From the spool 89' the cable 43' is carried vertically to a pulley 180 and is carried over this pulley 180 to a sheave 155 secured by universal joint means 171 to the rightward end of the arm 168', this sheave 155 being mounted in the manner previously described in a sheave supporting means 156a disposed at the rearward end of a cable guide tube 154.

In Figs. 7 and 8 I show my form of cable lift means especially adapted for use in extremely heavy ground working devices of the tractor-mounted type hereinbefore described. Herein a massive mould-board 180 is mounted on a cross member or yoke 181 which is connected to the forward ends of the arms 25 which are pivotally secured to the tractor 10 in the manner previously described, so as to be vertically swingable for the purpose of raising and lowering the earth pushing member 180. The yoke 181 is formed of a pair of structural channels 182 which, as shown in Fig. 9, carry a pin 183 which passes through openings 184 in horizontal planes 185 secured to the back of the member 180. The ends of this member 180 are supported by beams 186 which project forwardly from the front end of the arms 25.

The alternative form of the invention shown in Figs. 7 to 11 inclusive employs with a tractor 10 the same power take-off 46, with the associated parts necessary to direct the cable 43 through the cable tube 154 which connects to a sheave supporting member 156a mounted on a cross-shaft 42a supported by the right hand boom member 35 preferably formed of outer and inner plates 36 and 37, connected to the right hand tread element 13, all as previously described relative to Figs. 1 and 2.

Below the sheave 153a, Fig. 8, carried in the sheave supporting member 156a, a bracket 187 is mounted on the yoke 181, this bracket 187 supporting pins 188 on which sheave supporting blocks 189 and 190 are pivoted. These blocks 189 and 190 respectively carry sheaves 191 and 192, as shown in Fig. 10. Sheaves 193 and 194 are connected to the left side of the yoke 181 by use of blocks 189a and 190a and a bracket 187a similar in its general character to bracket 187 shown in Fig. 10. In the center of the yoke 181 a bracket 195 is secured. This bracket carries a substantially vertical pin 196 supporting a sheave 197. Above the sheave 197 a sheave 198 is carried in a clevis member 199 which is swung on a horizontal pin 200 carried by webs 201 which project upwardly from the bracket 195. On the cross-bolt 42b of the boom 35 at the left hand side of the tractor, a sheave 202 is mounted, and above the cross-bolt 42a at the right side of the tractor a sheave 203 is mounted adjacent to the sheave 153a.

As best shown in Fig. 8 and in the diagram Fig. 13, the forward end of the cable 43 is extended downwardly from the sheave 153a to the sheave 191 to produce a cable line 204. The cable is then extended as shown at 209 over the sheave 197 in the center of the yoke 181 to the sheave 193 at the left thereof. To form a cable line 207, the cable is then extended upwardly from the sheave 193 to the sheave 202, over which it is carried and from which it is conducted down to the sheave 194 to form a cable line 208. As indicated at 210 the cable is then carried from the sheave 193 across the sheave 198 to the sheave 192 at the right side of the yoke 181. From the sheave 192 the cable is extended upwardly to the sheave 203 to form cable line 206, and from the sheave 203 the cable is extended downwardly to provide a cable line 205, the lower end of which is connected, as shown in Fig. 10, to the bracket 187 by means of a cable clamp 211. In the manner shown a single cable 43 is employed to form a right hand cable lift means 215 and a left hand cable lift means 216 for the ground working tool 180 secured to the forward part of the yoke 181. Each of these cable lift means 215 and 216 comprises a plurality of cable lines. For example, the lift means 215 consists of lines 204, 205, and 206, and the cable lift means 216 consists of lines 207 and 208. When a pull is exerted in the cable 43, the lift exerted on the yoke 181 is equal to the tension in the cable 43 at the point where it passes over the sheave 153a, multiplied by a factor equal to the number of cable lines extending between the non-translational sheaves 153a, 202 and 203 and the yoke 181, diminished by a coefficient which allows for frictional loss due to the passage of the cable over the respective sheaves.

Where a cable is passed back and forth over a plurality of sheaves and the outer end thereof is secured to a suitable fastening, tension applied to the front end of the cable does not result in an instantaneous application of this same tension to the outer end of the cable, owing to the friction loss resulting from the passage of the cable over each consecutive sheave. In my present invention I provide for this natural reduction in cable tension from one to the other thereof due to the passage of the cable over a series of sheaves, by carrying the cable, after the forming of the first line 204, across the yoke 181 to the sheave 193 so as to form the second cable line 207 on the left side of the device, and then after forming the third cable line 208, carrying the cable across sheaves 194, 198, and 192 to the right side of the device where the slowest moving cable lines 205 and 206 are formed.

Although satisfactory results may be obtained where each of the cable lift means 215 and 216 comprises a pair of cable lines, I find that best results are obtained where the cable lift means 215 is comprised of the three lines 204, 205, and 206, the line 204 being the fastest moving, and the lines 205 and 206 being the slowest moving of the entire assembly of cable lines 204, 205, 206, 207, and 208. In the operation of the cable lift means for the ground working tool, it is desired that the lift on each side of the yoke 181 be the same.

How this is accomplished will be seen from the following analysis. Assuming that a tension of ten pounds is produced in the cable line 204. This will not result in an instantaneous production of a tension of ten pounds in the cable lines 207 and 208, but the tensions produced in lines 207 and 208 will be decreased as the result of friction loss in the passage of the cable over sheaves 197, 193, and 202. Likewise, the friction loss due to the passage of the cable over the sheaves 194, 198, and 192 will result in a reduction in pull exerted to the line 206, and a further reduction in the pull will result from the passage of the cable over the sheave 203. Accordingly, the lift exerted by the lines 207 and 208 will be reasonably close to the lift exerted by the lines 204, 205, and 206. Not only is the desired lifting of the yoke 181 and its attached tool 180 obtained, but the tension required in the cable 43 to accomplish the same is materially reduced and the load against which the power take-off must operate is correspondingly reduced so that the clutch and other parts thereof may be used for a long period of time without attention.

I claim as my invention:

1. In a device of the character described, the combination of: a vehicle having a body structure and an undercarriage structure with ground engaging elements at the sides thereof vertically movable relative to said body structure; tool means supported at an end of said vehicle so as to be moved upwardly and downwardly relative to the ground; a sheave member mounted on one of said ground engaging elements near to said tool means and so as to move therewith as the same moves relative to said body structure; a cable connected to said tool means and running over said sheave member, a cable actuating member mounted on said vehicle; a second sheave member movably mounted on said body structure in operative position relative to said cable actuating member, said cable running from said first sheave member to said cable actuating member; and cable guide means guiding said cable from one of said sheaves to the other and connecting said sheave members together so that said second sheave member will move in response to movement of said first named sheave member.

2. In a device of the character described, the combination of: a vehicle having a body structure and an undercarriage structure with ground engaging elements at the sides thereof vertically movable relative to said body structure; tool means mounted at the forward end of said vehicle so as to be moved up and down relative to the ground; a sheave member mounted on the forward end of one of said ground engaging elements in operative relation to said tool means and so as to move with said ground engaging element as the same moves relative to said body structure of said vehicle; a cable connected to said tool means and running over said sheave member; a cable actuating member mounted on said vehicle; a second sheave member mounted in operative relation to said cable actuating member, said cable member running from said first named sheave member over said second sheave member to said cable actuating member; an arm pivotably mounted on said body structure, the swinging end of said arm being pivotally connected to said second named sheave member; and means connecting said sheave members together so that said second named sheave member will move in response to movement of said first sheave member.

3. In a device of the character described, the combination of: a tractor having a body structure and tread elements movably connected thereto vertically movable relative to said body structure; tool means supported for operative movement at the forward end of said tractor; a boom member mounted on the forward end of one of said tread elements so as to move therewith as said tread elements moves relative to said body structure; a cable guide carried by said boom member near said tool means; cable actuating means on said tractor; a second cable guide disposed in operative relation to said actuating means; a cable extending from said tool means and over said guides to said actuating means; an arm pivotally mounted on said body structure, the swinging end of said arm being connected to said second guide so as to support the same; and a strut extending between said first and second guides, said strut having its front end pivotally connected to said boom member and its rear end pivotally connected to said arm.

4. A device as defined in claim 3 in which said strut comprises a tube through which said cable passes.

5. In a device of the character described, the combination of: a tractor having a body structure and tread elements movably connected thereto; tool means supported for operative movement at the forward end of said tractor; a boom member mounted on the forward end of one of said tread elements so as to move therewith; forward sheave means mounted on said boom member; a tubular member extending rearwardly from said forward sheave means; rearward sheave means connected to the rearward end of said tubular member; means on said body structure of said tractor for movably supporting the rearward end of said tubular member; cable actuating means mounted on said tractor adjacent said rearward sheave means; and a cable extending from said tool means, over said sheave means and through said tubular member to said cable actuating means.

6. In a device of the character described, the combination of: a tractor having a body structure and tread elements movably connected thereto; tool means mounted at the forward end of said tractor for movement relative to the ground; sheave means connected to said tool; a separate boom member mounted on each of said tread elements so as to be independently moved vertically by and in accordance with the movement of said tread elements; a sheave mounted on one of said boom members; a tube extending rearwardly from said sheave; cable guide means at the rearward end of said tube; cable actuating means disposed at the rearward end of said tube; and a cable extending from the other of said boom members over said sheave means to said sheave, and thence through said tube and said guide means to said cable actuating means.

7. In a device of the character described, the combination of: a tractor having a body structure and tread elements connected to the sides thereof; tool means mounted at the forward end of said tractor for movement relative to the ground; a separate boom member mounted on each of said tread elements so as to be independently moved vertically by and in accordance with the movement of said tread elements; cable suspension means for said tool means comprising a cable extending downwardly from one of said boom means to said tool means, then across said tool means to the opposite sides thereof, and upwardly from said opposite side of said tool means to the other of said boom members, and thence again to said tool means and back to the first of said boom members so that there will be fast and slow cable lines extending from each of said boom members to said tool means; and means operative to vary the effective length of said cable.

8. In a device of the character described, the combination of: a tractor having a body structure and tread elements movably connected to the sides thereof; tool means mounted at the forward end of said tractor so as to be raised and lowered relative to the ground; a boom member mounted on the forward portion of each of said tread elements, each of said boom members comprising a pair of plates secured on opposite sides of the forward portion of a tread element and being joined together above the forward portion of the tread element, said boom members having independent movement in accordance with the movement of the tread elements to which they are respectively attached; a cable guide supported at the upper end of one of said boom members; a cable winch mounted on the body of said tractor at a point spaced from its front end; a second cable guide supported on said body in operative relation to said winch so as to have a component of movement in substantially longitudinal direction; a cable extended from the other of said boom members to said tool means, then to said first cable guide, to said second cable guide and finally to said winch; and a strut disposed in compression between said one of said boom members and said second cable guide to hold said second cable guide spaced from said first cable guide, said second cable guide moving substantially horizontally in response to change in position of said first cable guide.

9. In a device of the character described, the combination of: a tractor having a body structure and tread elements movably connected to the sides thereof; tool means mounted at the forward end of said tractor so as to be raised and lowered relative to the ground; a boom member mounted on the forward portion of each of said tread elements, each of said boom members comprising a pair of plates secured on opposite sides of the forward portion of a tread element and being joined together above the forward portion of the tread element, said boom members having independent movement in accordance with the movement of the tread elements to which they are respectively attached; a cable guide supported at the upper end of one of said boom members; a cable winch mounted on the body of said tractor at a point spaced from its front end; a second cable guide; a support on said body carrying said second cable guide in a raised position, said support having a substantially longitudinal component of movement; a cable extended from the other of said boom members to said tool means, then to said first cable guide, to said second cable guide and finally to said winch; and a strut connected between said one of said boom members and said support to hold said cable guides in spaced relation.

10. In combination with a tractor having independently vertically movable tread elements at the sides thereof, an attachment comprising: tool means connected to the tractor so as to be raised and lowered; a support mounted on each of said tread elements so that each will have a movement independent of the other as said tread elements move vertically; suspension means for said tool means, said suspension means comprising sheave members connected to said supports and to said tool means, and a cable threaded over said sheave members so as to form a pair of lines extending from each of said supports to said tool means with one line of each pair being a fast line and the other line of each pair being a slow line; and means for varying the effective length of said cable forming said suspension means whereby said tool means will be raised or lowered.

11. In combination with a tractor having a body with independently vertically movable tread elements at the sides thereof, an attachment comprising: tool means mounted for operative movement at the forward end of the tractor; a front sheave support mounted on one of said tread elements so as to have vertical movement therewith; a front cable sheave mounted on said front support; a cable actuating means mounted on said tractor body; a rear sheave support on said tractor body; a rear sheave mounted on said rear support; a cable running from said cable actuating means over said sheaves to said tool means; and a member extending between said sheaves, said member having its front end pivotally connected to said front sheave support and its rear end pivotally connected to said rear sheave support.

12. In combination with a tractor having a body with independently vertically movable tread elements at the sides thereof, an attachment comprising: tool means mounted for operative movement at the forward end of the tractor; a front sheave support mounted on one of said tread elements so as to have vertical movement therewith; a front cable sheave mounted on said front support; a cable actuating means mounted on said tractor body; a rear sheave mounted adjacent said cable actuating means and in a position rearward of said front sheave; a cable running from said cable actuating means over said sheaves to said tool means at the front end of the tractor; and a cable guide tube extending rearward from said front sheave toward said rear sheave to guide the portion of said cable which extends between said sheaves, there being means for supporting the rearward portion of said tube and the forward portion of said tube being connected to said front sheave support so as to rise and fall with said tread element as the same moves vertically.

13. In a device of the character described, the combination of: a tractor having a body structure and tread elements movably connected thereto; tool means supported for operative movement at the forward end of said tractor; a boom member mounted on one of said tread elements so as to move therewith as said tread element moves relative to said body structure; a cable guide carried by said boom member near said tool means; cable actuating means on said tractor; a second cable guide disposed in operative relation to said actuating means; a cable extending from said tool means and over said guides to said actuating means; an arm mounted on said body structure, the end of said arm being connected to said second guide so as to support the same; and means disposed in a plane above one of said tread elements for connecting said second guide to said first guide so that said first guide may move up and down relative to the other and relative to said body structure as said boom member moves relative to the body structure of the tractor.

ALBERT ASHTON.